Figure 7:
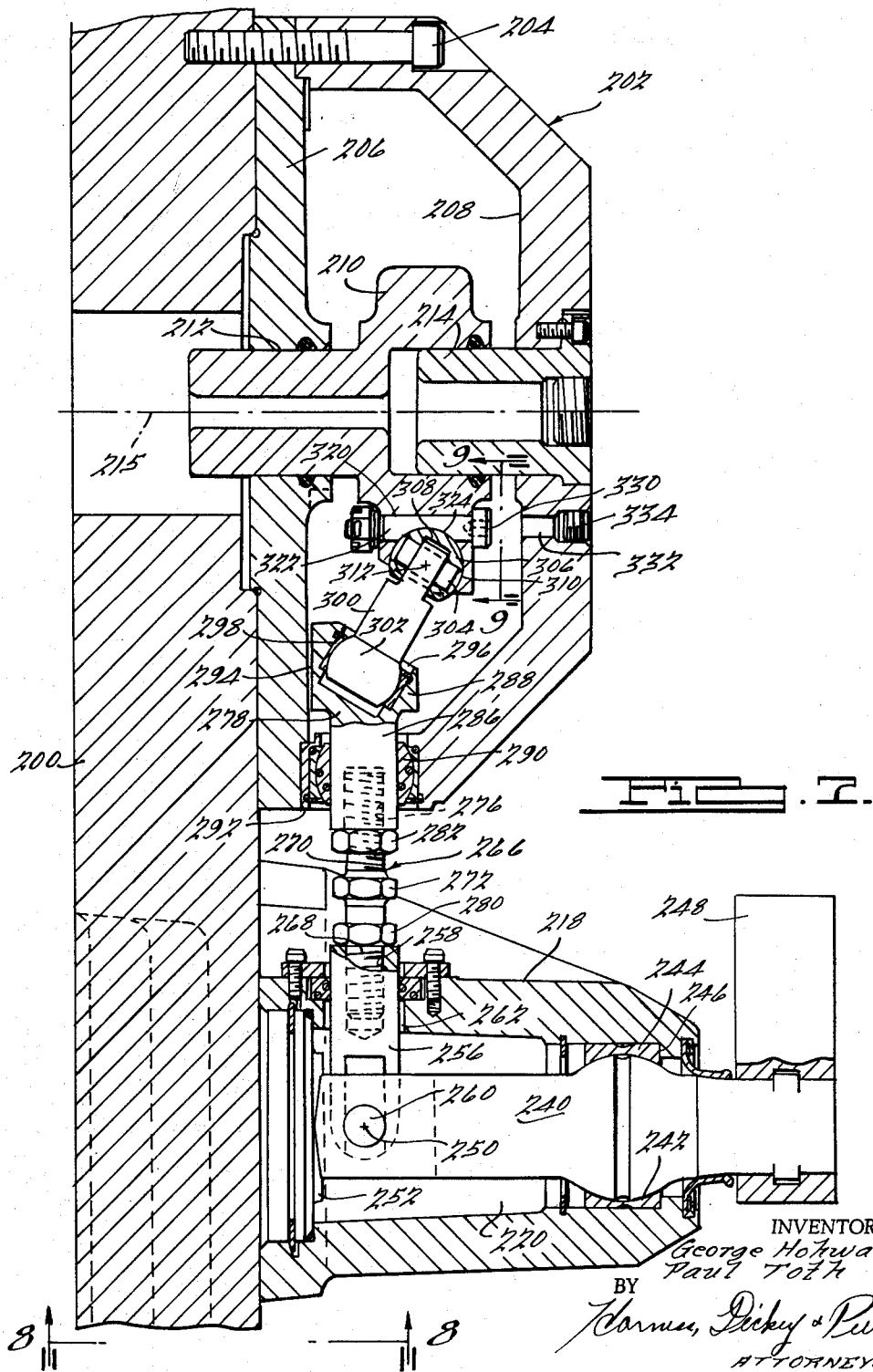

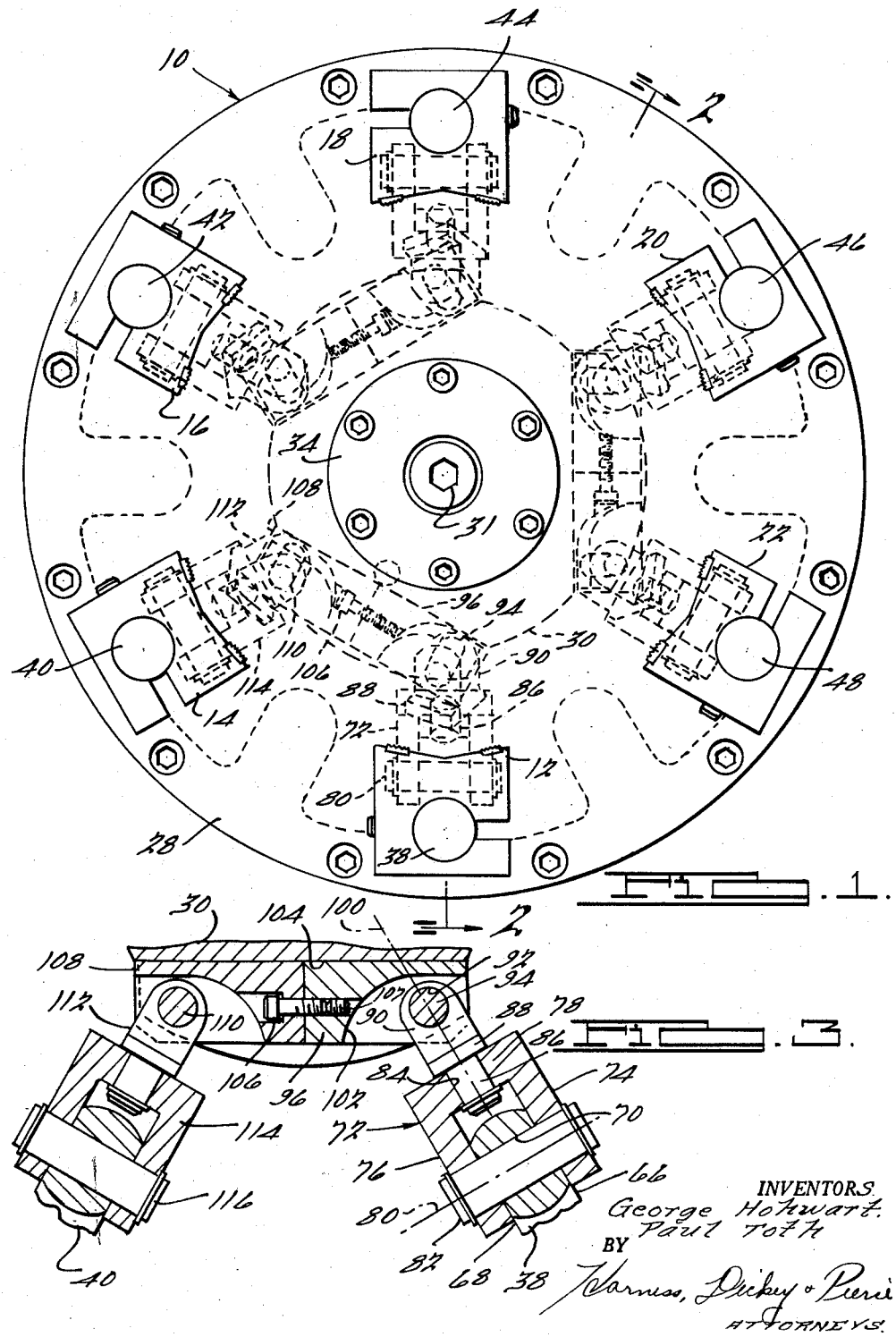

March 19, 1963
G. HOHWART ETAL
3,082,015
EQUALIZING CHUCK
Filed Nov. 28, 1961
5 Sheets-Sheet 2
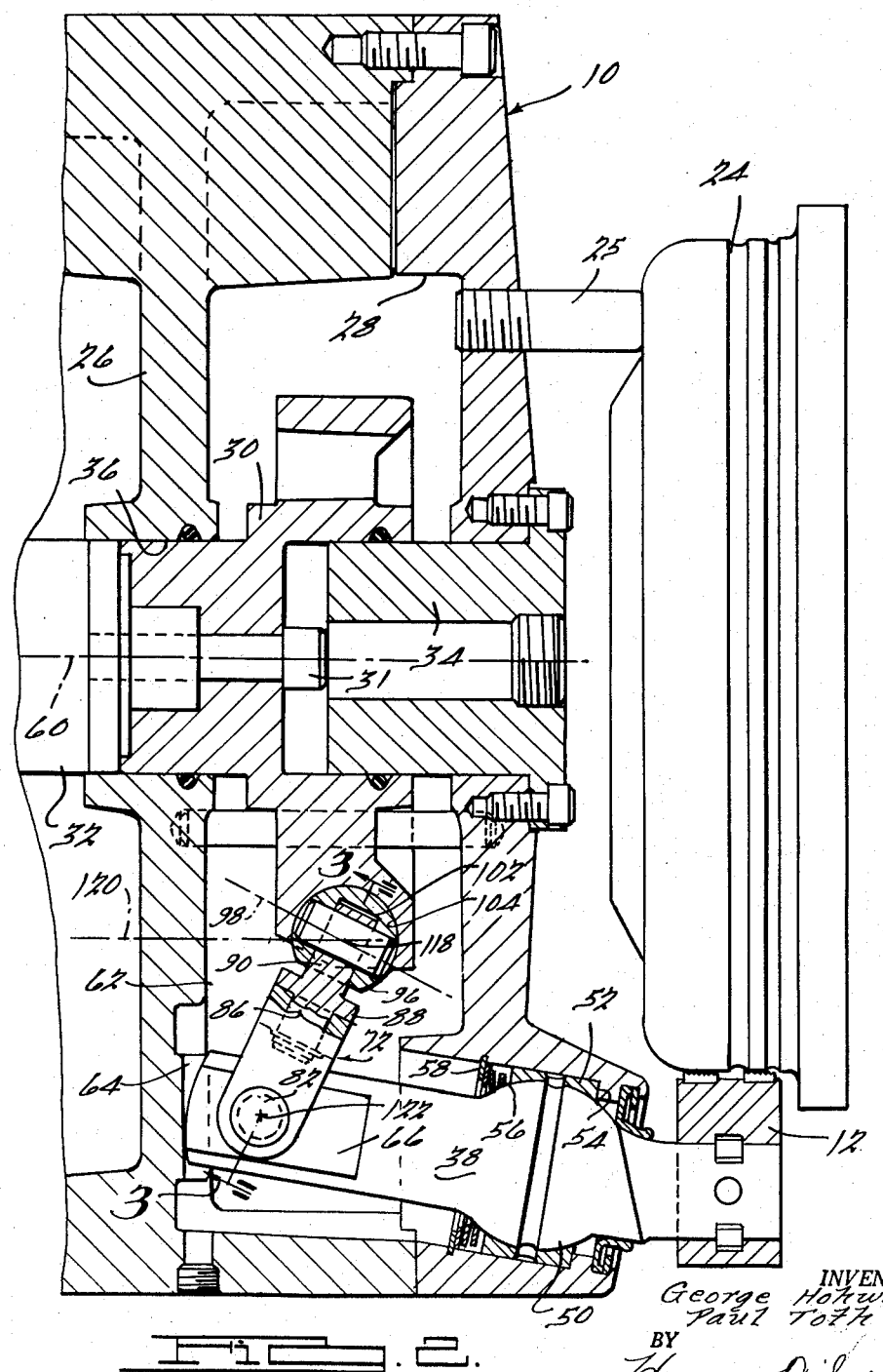
INVENTORS.
George Hohwart
Paul Toth
BY
Barnes, Dickey & Pierce
ATTORNEYS March 19, 1963 G. HOHWART ETAL 3,082,015
EQUALIZING CHUCK
Filed Nov. 28, 1961 5 Sheets-Sheet 3
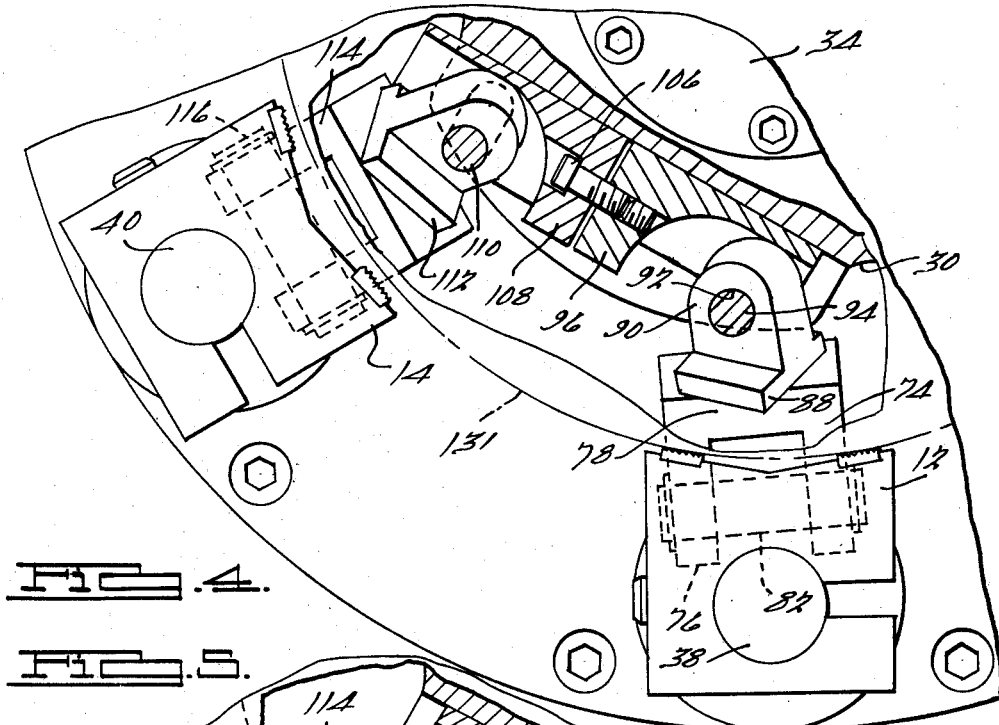
FIG. 4.
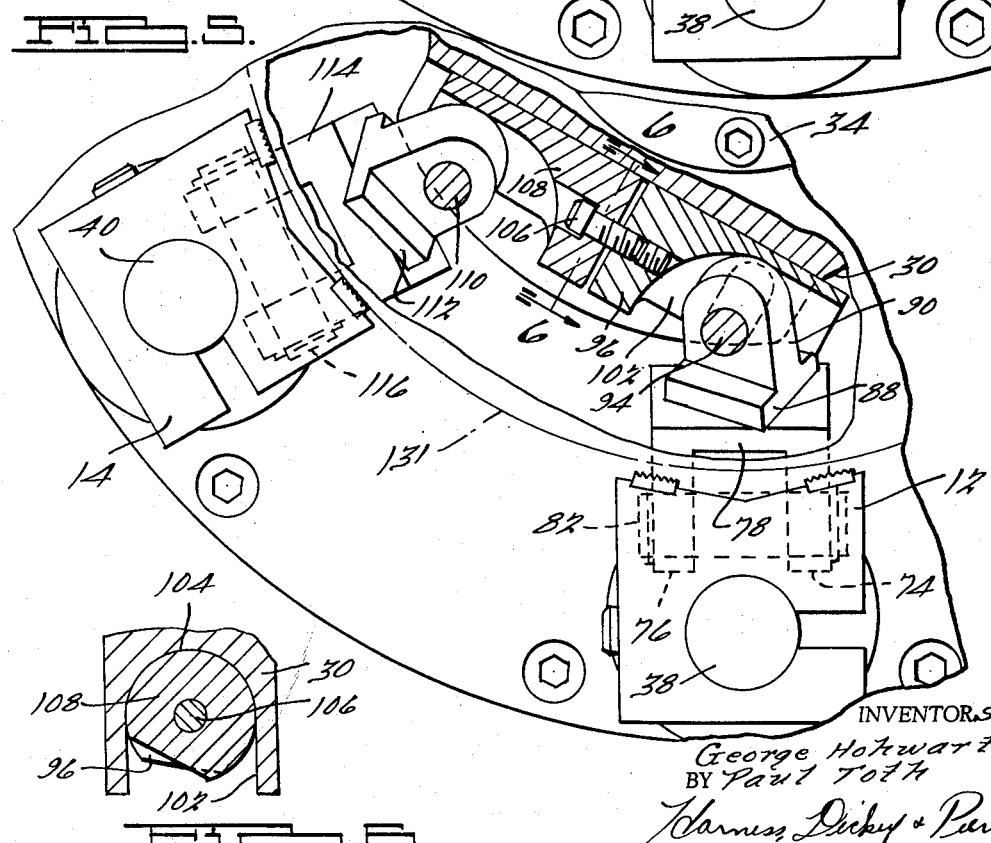
FIG. 5.
FIG. 6.
INVENTORS.
George Hohwart
BY Paul Toth
Harness, Dickey & Pierce
ATTORNEYS March 19, 1963

G. HOHWART ETAL 3,082,015

EQUALIZING CHUCK

Filed Nov. 28, 1961

5 Sheets-Sheet 4

INVENTORS.
George Hohwart
Paul Toth
BY
Harness, Dickey & Pierce.
ATTORNEYS.

March 19, 1963 G. HOHWART ETAL 3,082,015
EQUALIZING CHUCK
Filed Nov. 28, 1961 5 Sheets-Sheet 5
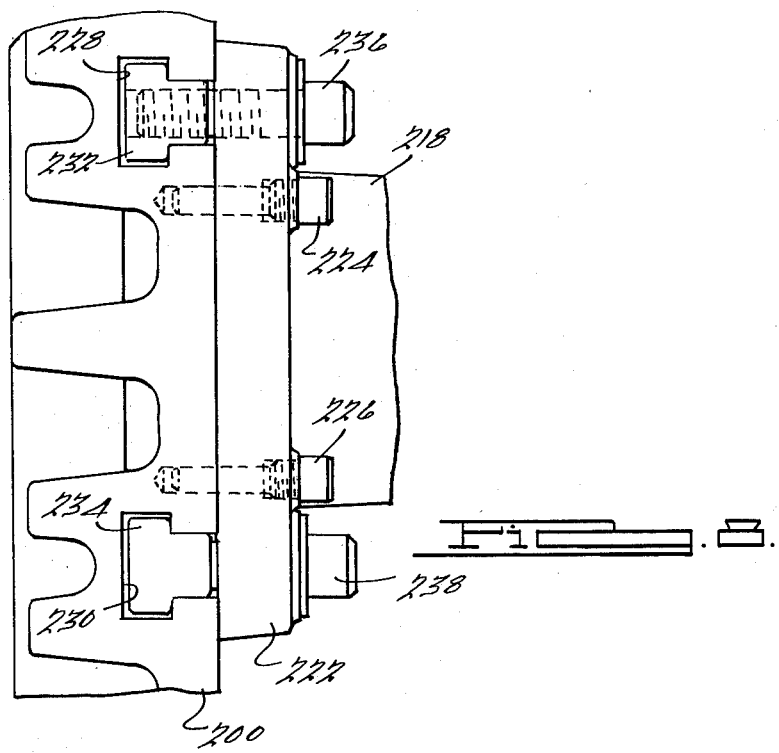
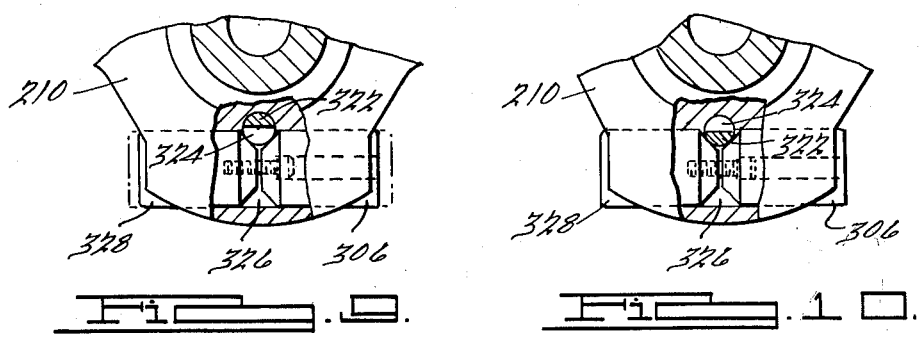
INVENTORS.
George Hohwart
Paul Toth
BY
Harness, Dickey & Pierce
ATTORNEYS United States Patent Office 3,082,015
Patented Mar. 19, 1963

3,082,015
EQUALIZING CHUCK
George Hohwart, Farmington Township, Oakland County, and Paul Toth, Allen Park, Mich., assignors to N.A. Woodworth Company, Ferndale, Mich., a corporation of Michigan
Filed Nov. 28, 1961, Ser. No. 155,403
13 Claims. (Cl. 279—106)

This invention relates to chuck apparatus for gripping a workpiece or the like, and more particularly to chuck apparatus having a plurality of jaw elements which are self-adjusting in operation to obtain equalized clamping pressures between each of the jaw elements and the workpiece.

The general chuck structure of the present invention, which comprises a plurality of pivotally mounted jaw elements movable from an open release position to a closed gripping position by means of axial displacement of an actuator means, is well known. The actuator means may be in the form of a conventional draw bar, a power cylinder, or other suitable means. Such structure is shown in detail in copending application Serial Number 33,542, for "Chuck," filed June 2, 1960, in the names of George Hohwart and Paul Toth, and assigned to the assignee of the present invention. A problem in chucks of previous designs has been unequal pressure distribution through the various jaw elements thereof. In six jaw chucks, for example, which are designed to grip a workpiece at a plurality of spaced peripheral locations, the initial contact of the individual jaw elements with the surfaces of the workpiece is sometimes effected at different times during the closing of the jaw elements. Consequently, the workpiece may acquire a position within the chuck whereat substantially greater forces are being applied through some of the jaw elements than through others. Furthermore, the peripheral surfaces of the workpiece may be dimensionally located relative to one another in a manner precluding any adjustment of the workpiece relative to the jaw elements to obtain equal contact therewith and equal force application through each jaw element to the workpiece.

In order to provide a chuck arrangement wherein equal forces are applied, one problem is to obtain equal force distribution when the jaw elements have reached their closed gripping position and another directly related problem is that of equalizing force application during movement to the closed gripping position when the jaw elements engage the workpiece at different intervals. If the jaw closing forces are applied unevenly, the workpiece may become misaligned within the jaw elements and, in some cases with relatively thin walled workpieces of relatively low strength characteristics compared with the gripping forces exerted through the jaw elements, the application of excess force through the jaw elements may cause unwanted deformation of the workpiece.

Accordingly, it is an object of the present invention to provide chuck apparatus incorporating self adjusting force equalizing clamping assemblies. Another object is to provide chuck apparatus having a plurality of jaw elements which are self compensating for variations in pressures applied to a workpiece to thereby equalize pressure application between jaw elements. A still further object of this invention is to equalize pressure application through chuck jaw elements at all times of chuck operation including the time interval during closing movement of the jaw elements to a gripping position, the time interval of gripping action of the jaw elements during a manufacturing operation on the workpiece, and the time interval during opening movement of the jaw elements to a release position. Another object of the invention is to provide mechanical pressure equalizing means for jaw elements of chuck apparatus which are reliable and accurate in operation, and yet comprise a minimum of parts of relatively simple design which are rugged and sturdy in use and result in a minimum of wear and repair. The aforementioned objects, and other purposes and advantages of the present invention, will be more fully understood by reference to the following detailed description wherein:

FIGURE 1 is a plan view of illustrative chuck apparatus embodying the principles of the present invention;
FIGURE 2 is a sectional view taken along the line 2—2 in FIGURE 1;
FIGURE 3 is a partial sectional view taken along the line 3—3 in FIGURE 2;
FIGURE 4 is an enlarged fragmentary plan view, partially in section, of the apparatus shown in FIGURE 1 in a first operational position;
FIGURE 5 is another enlarged fragmentary plan view, partially in section, of the apparatus shown in FIGURE 4 in another operational position;
FIGURE 6 is a sectional view taken along the line 6—6 in FIGURE 5;
FIGURE 7 is a fragmentary side elevational view, in section, of an alternative embodiment of the present invention;
FIGURE 8 is a partial end view taken along the line 8—8 in FIGURE 7;
FIGURE 9 is a partial sectional view taken along the line 9—9 showing a portion of the apparatus in a first operational position; and
FIGURE 10 is another partial sectional view of the same apparatus in another operational position.

Referring now to the drawings, a chuck assembly, indicated generally at 10, is provided with a plurality of jaw elements 12, 14, 16, 18, 20, 22 at equally spaced intervals around the periphery thereof. The jaw elements are operable in pairs 12—14, 16—18, and 20—22 to grippingly engage and support workpiece 24, which is shown by way of example as an annular brake drum of the type used in vehicular applications, on stop pins 25 spaced around the jaw cavity. It is to be understood that the number and arrangement of the jaw elements may be varied, although particular advantageous results are obtained from the particular arrangement hereinafter described in more detail. The chuck structure is conventional insofar as the details of a chuck housing comprising a backing plate 26, a cover plate 28, a jaw actuating element 30, actuator means here shown in the form of a draw bar 32, and a guide bushing 34 are concerned. The draw bar 32 is connected at the outer end to the jaw actuator 30 by a bolt 31 and is axially movable to reciprocate the jaw actuator within the bore 36 in the backing plate and along the guide bushing 34 secured to the cover plate. Each of the jaw elements are rotatably connected to and movable by jaw arms 38, 40, 42, 44, 46, 48 in a manner described more completely in the aforementioned copending application Serial Number 33,542. Since each of the jaw units is identical in structure, only the pair of jaw units 12—14 are hereinafter described in detail.

Referring now to FIGURES 2 and 3, the jaw elements are simultaneously movable between open positions to workpiece engaging positions by rearward movement of the draw bar and jaw actuator resulting in inward arcuate movement of the jaw elements due to mechanical linkage means which connect the jaw actuator and the jaw arms. Each of the jaw arms includes an intermediate ball portion 50 which is mounted within socket means 52 to provide a ball and socket joint. The socket means are mounted on a seat 54 in the cover plate by a spring means 56 and a spring retainer plate 58. The socket cavity is inclined relative to the central longitudinal axis 60 of the draw bar and chuck housing, and extends radially and axially outwardly relatively to the cover plate. The inner end of the jaw arms extend into a cavity 62 provided between the cover plate and the back up plate and are located within grooves 64 provided on the inner wall of the back up plate. The end of the arm is provided with oppositely located flats 66, 68 and is provided with a bore 70 extending therethrough at substantially right angles to the flats. A clevis member 72 having spaced legs 74, 76 extends from a web portion 78, straddles the flats and is pivotally connected to the jaw arm about a pivotal axis 80 provided by pin means 82. The web portion is provided with a centrally located bore 84 which extends at substantially right angles to the axis 80 of the pin means and is spaced outwardly from the top surface of the jaw arm to permit a stub shaft 86 to be rotatably secured therein. The stub shaft is formed integrally on a base plate 88 of a T-shaped coupling having a flange 90 extending oppositely from the stub shaft at right angles to the base plate. A transverse bore 92 is provided in the flange and receives pin means 94 which are fixedly mounted in a substantially cylindrical compensating member 96. The T-shaped coupling is therefore pivotally mounted relative to the compensating member about a first pivotal axis 98 and is pivotally mounted relative to the clevis about a second pivotal axis 100 which extends at right angles to the first pivotal axis. A longitudinal groove 102 is provided in the compensating member 96 to permit pivotal movement of the T-shaped coupling relative thereto about axis 98. The compensating member is slidably and rotatably mounted in a substantially cylindrical bore 104 in the actuator. The bore extends tangentially relative to an imaginary circle drawn with the center on the central longitudinal axis 60 of the chuck and has a chordal relationship with the arcuate periphery of the annular actuator. In the illustrative embodiment, the jaw elements work as pairs and the compensating member 96 is connected by a threaded fastener 106 or the like to a similar compensating member 108 which is also slidably and rotatably mounted in bore 104. A set screw 107 is provided to lock the threaded fastener 106 in a particular adjusted position. The compensating members 96, 108 are also rotatable relative to one another. The adjacent jaw element 14 is operable through pin means 110, a T-shaped connecting element 112, a clevis 114, pin means 116, and the jaw arm 40 as hereinbefore described.

In normal operation, as the actuator is drawn rearwardly, the inner ends of the jaw arms will be pivoted arcuately outwardly about the ball and socket joints and the outer ends of the jaw arms will be pivoted arcuately inwardly to move the jaw elements into clamping engagement with the workpiece. Since the linear distance between the points 118 and 122 is fixed and remains constant at all times, the point 122 on the central axis 80 of the pin means 82 will be displaced arcuately outwardly in direct proportion to the amount of movement of the actuator. In order to permit continuous movement of the actuator without corresponding radial displacement of the jaw arm and the jaw element, lost motion means must be provided to permit movement of the linkage relative to the actuator. The movement of the linkage is provided for by a sliding action of the compensating member relative to the actuator which moves the point 118 longitudinally of the bore 104 and transversely of the axial movement of the actuator.

In order to permit sliding movement of the compensating member, universal joint means must be provided. In the embodiment shown in FIGURE 2, the universal joint means are provided between the linkage and the jaw arm by a compound joint formed by the pivotal connection of the clevis to the jaw arm and the rotary connection of the T-shaped connector to the clevis. The axis of rotation of the T-shaped connector is always perpendicular to the pivotal axis of connection of the clevis relative to the arm. However, the pivotal axis of the pin means connecting the clevis to the arm changes angular relationship relative to the central axis of the compensating member as the compensating member moves transversely of the chuck axis 60. The linear movement of the compensating member relative to the actuator results in curvilinear movement of a point on the end of the jaw arm. Consequently, a twisting movement is developed which is relieved by the rotary connection between the clevis and the T-shaped connector. The rotary connection and the pivotal connection of the clevis to the jaw arm provide an effective universal joint which permits essentially unrestrained movement of the jaw arm about its ball and socket joint. Universal joint means are also provided between the linkage and the actuator by rotary movement of the compensating member within the bore 104 and pivotal movement of the T-shaped connector about the pin means 94. Consequently, the lost motion means are effective to prevent excessive force application as long as the compensating member is relatively slidable within the bore 104 provided in the actuator. When each of the jaws 12, 14 has been moved into contact with the workpiece and equal reaction forces are being transmitted from the workpiece through the jaw elements, the equal and opposite linear motion of the compensating members 96, 108 are abated and continued movement of the actuator results in corresponding radial inward displacement of the jaw elements 12—14 and application of equal gripping pressure through each jaw element to the workpiece. Accordingly, the pairs of jaws are adjustable relative to one another and each jaw of each pair is adjustable relative to the other jaw of the pair to obtain complete pressure equalization during chuck operation. Relative adjustment between jaws 12 and 14 is illustrated in FIGURES 4 and 5 by reference to an imaginary circle 131 drawn with its center on the central axis 60 of the chuck. Movement of the compensating members 96, 108 relative to the actuator 30 from the position shown in FIGURE 4 to the position shown in FIGURE 5 causes corresponding displacement of the jaws 12, 14 relative to circle 131.

An alternative embodiment is shown in FIGURES 7–10 and comprises a base plate 200 on which a chuck housing 202 is mounted by suitable fastening means such as the bolts 204. The housing comprises a backup plate 206 and a cover plate 208. A jaw actuator 210 is slidably mounted in a bore 212 provided in the backup plate and is slidably cooperable with a guide bushing 214. A plurality of jaw means (not shown) are circumferentially spaced around the central axis 215 of the chuck housing. Since each of the jaw means and linkage means are identical, only one of the jaw means is illustrated. A support pillar 218 having a central bore 220 is mounted on the base plate 200 by a flange portion 222 and suitable fastening means 224, 226 as shown in FIGURE 8. The support pillar is adapted for slidable adjusting movement radially of the chuck housing and for this purpose T-shape guide slots 228, 230 are provided in the base plate. Corresponding T-shape rails are provided by block elements 232, 234 which are supported within the guide slots by the fastening means 236, 238.

Referring to FIGURE 7, a jaw arm 240 is mounted in the bore 220 and is provided with a ball portion 242 which is movably mounted in a bearing race 244 secured on a shoulder 246 of the bore. A jaw element 248 is rotatably mounted on the outer end of the jaw arm and the inner end of the jaw arm is connected to actuating linkage means at 250. A guide slot for the inner end of the jaw arm is formed in a plate 252 which is secured in the bore 220.

The linkage means comprises a coupling element 256 having a threaded bore 258 at one end and pin means 260 at the other end forming a pivotal connection with the end of the jaw arm at 250. The coupling element 256 extends outwardly through a side opening 262 in the pillar and is adapted to have sliding movement therein. A power connector 266 having reversely threaded end portions 268, 270 separated by an adjusting nut portion 272 is threadably received within the threaded bore 258 at one end. The other end of the power connector is threadably received in a threaded bore 276 provided in a slide block 278. Locking nuts 280, 282 are provided on each of the threaded portions 268, 270 to secure the power connector in a particular adjusted position. The length of the connection between the slide block 278 and the coupling element 256 is adjustable by rotating the power connector. Rotation of the power connector in one direction causes movement of each of the threaded ends 268, 270 outwardly in the threaded bores and rotation in the opposite direction causes opposite movement of each of the threaded ends inwardly in the threaded bores. When a desired adjustment has been effected, the locking nuts are tightened into the ends of the coupling element and the slide block.

The slide block comprises an elongated end portion 286 and a head protion 288. The end portion 286 is slidably received in a bearing element 290 which incorporates a ball and socket joint and is mounted in a side bore 292 extending through the cover plate. The head portion is provided with a slide guide surface 294 which cooperates with the adjacent surface of the backup plate and a counterbore 296 which is inclined relative to the central axis 215 of the slide block toward the actuator 210. A ball socket is formed in the counter bore 296 by a socket plate 298 which is secured therein. A link 300 is provided at one end with a ball joint 302 which is received by the socket plate to form universal joint means. The other end of the link is pivotally connected by pin means 304 to compensating member 306 in the form of a slide cylinder. A slot 308 extending longitudinally of the slide cylinder receives a reduced end portion of the link. The slide cylinder is slidably mounted in a cylindrical bore 310 in the actuator which extends tangentially to an imaginary circle drawn through a point 312 at the intersection of the longitudinal axis of cylinder 306 and the longitudinal axis of the pin means 304 and having a point in the axis 215 as center.

A control means is provided for each set of linkages to permit the linkage means to be rigidized if the equalization feature is not desired. For this purpose, a bore 320 extends through the actuator 210 parallel to the central axis thereof and intersects the slide bore 310. A pin element 322 having an arcuate groove 324 formed in one side thereof extends within the bore and is located between a V-shaped groove 326 provided by the connection of the slide cylinder 306 to a similar compensating member 328, shown in FIGURES 9 and 10, which is connected to a similar jaw arrangement through similar linkage in the manner hereinbefore described. The pin element is provided with an adjusting head 330 which is located in alignment with an access hole 332 in the cover plate. A plug 334 is provided in the access hole to prevent chips, oil and other debris from entering the chuck cavity during operation. It is to be noted that all of the openings to the chuck cavity and the jaw arm cavity are provided with suitable sealing means. A wrench may be inserted through the access opening when the plug is removed to turn the pin element within its bore. When the arcuate groove in the pin is aligned with the cylindrical slide bore as shown in FIGURES 7 and 9, the slide cylinders are freely movable and the chuck jaw forces may be equalized. When the pin is rotated so that the arcuate groove moves out of alignment as shown in FIGURE 10, the body of the pin is moved into the V-groove 326 between the slide cylinders and prevents any movement thereof.

To operate the chuck to a closed gripping position with a workpiece located in the jaw cavity, the actuator is moved rearwardly in any suitable or conventional manner as by a draw bar or power cylinder (not shown). In the resultant movement of the linakge and jaw means when the pin elements are in the positions preventing equalization shown in FIGURE 10, the linkage means pivotal connection with the compensating member is moved rearwardly in a straight line and the linkage means pivotal connection with the slide block is moved linearly outwardly to cause sliding movement of the slide block through the bore 292. The sliding movement is transferred through the power conector to the inner end of the jaw arm at the pivotal connection formed by the pin means 260. The jaw arm is pivoted or rocked about the ball portion 242 within the socket plate 244 and the jaw element is moved inwardly into clamping engagement with the workpiece. The movement of the actuator is directly transferred into corresponding movement of the linkage means and jaw arm. The amount of movement and pressure applied through the jaw element is directly proportional to the amount of movement of the actuator.

When the pin means 322 is adjusted to bring the arcuate groove 324 into alignment with the substantially cylindrical bore 310, the slide cylinders 306, 328 are movable therein to equalize pressures on the jaw elements by providing lost motion means to permit relative movement between the actuator and the linkage means whereby continued movement of the actuator does not result in equivalent movement and pressure application through the jaw elements. When one of the jaw elements 248 contacts the workpiece prior to contact of the other jaw element, the slide cylinders will move within the slide bore until pressures on the jaw elements are equalized. Until the pressures become equalized, movement of the actuator will result in sliding and rotative movement of the slide cylinders to variably position the pivotal connections between the linkages and the slide cylinders transversely to the path of movement of the actuator and thereby maintain the pivotal connections to the slide blocks in substantially the same positions. The universal joint provided by the ball and socket connection between the linkage and the slide block permits the relative angles between the actuator, the linkage, and the slide block to change as necessary to prevent binding of the parts. When the pressures are equalized and the slide cylinders can no longer move within the slide bore to provide a lost motion means, the movement of the actuator will again be directly transferred through the linkage and jaw arm to the jaw elements.

Although the jaw elements of the present invention are adapted to provide equalization of individual pairs of jaws in a particular manner, it is contemplated that other means embodying the principles of the invention which are equivalent to the shiftable lost motion means described herein may be utilized to obtain chuck jaw pressure equalization. As has been shown by the alternative embodiment, the particular linkage means connecting the lost motion mechanism and the jaw element may be varied in design. In addition, the particular jaw arrangement and general chuck structure may be varied without affecting the jaw equalization. Accordingly, it is intended that such modifications and variations in the arrangement of the parts which embody the principles of the invention are to be included within the scope of the appended claims, except insofar as limited by the prior art.

What is claimed is:

1. In chuck apparatus comprising a plurality of jaw means movable inwardly and outwardly relative to a central axis, movable actuator means to cause movement of said jaw means, and linkage means connecting said jaw means and said actuator means; the improvement comprising for each jaw means: lost motion means being connected between each jaw means and said actuator means and being operable in response to pressure differentials existing between said jaw means to prevent movement of said actuator from causing corresponding movement of said jaw means until said pressure differential ceases to exist whereby pressure equalization is attained between said jaw means.

2. In chuck apparatus as defined in claim 1 and wherein said lost motion means comprises a mechanical slide means adapted to shift positions in response to operation of said actuator means and dissipate motion normally transferred to said jaw means through said linkage means.

3. In chuck apparatus as defined in claim 2 and wherein said mechanical slide means comprises for each jaw means, a slide bore formed in said actuator means, a slide block slidably and rotatably mounted in said slide bore, and the axis of said slide bore and the path of movement of said slide block being at right angles to an imaginary line extending at right angles from the central axis of said chuck apparatus and at right angles to the central axis.

4. In chuck apparatus as defined in claim 3 and having universal joint means connecting said linkage means to said jaw means to accommodate simultaneous movement of said linkage means in a plurality of transverse planes and prevent binding thereof during movement of said slide block.

5. In the chuck apparatus as defined in claim 3 and having control means to render said lost motion means inoperative, said control means comprising a pin means, a bore transversely intersecting said slide bore, a groove provided on said pin element and corresponding to the inner peripheral surface of said slide bore at the intersecting groove means provided in said slide means to receive said pin means, and means to rotate said pin means from a position extending within said groove means and preventing axial displacement of said slide means to a position whereat said groove means in said pin means forms a continuation of said slide bore to prevent axial displacement of said slide means.

6. In chuck apparatus as defined in claim 1 and wherein control means are provided for each lost motion means to render said lost motion means inoperative.

7. In chuck apparatus comprising a chuck housing, a plurality of jaw means mounted on said chuck housing for radial displacement relative to the central axis of said chuck housing, actuator means to cause movement of said jaw means, reciprocable drive means for applying retracting forces on said actuator means and causing movement thereof parallel to the central axis of said chuck housing, ball and socket means mounting said jaw means for universal movement relative to said chuck housing, and linkage means connecting said ball and socket means and said actuator means to permit relative movement therebetween without effecting radial inward displacement of certain ones of said jaw means through which pressure forces are being transferred that are greater than pressure forces being transferred through others of said jaw means until the clamping pressures at each jaw means are substantially equalized and thereafter causing equal movement of all of said jaw means in direct proportion to movement of said actuator means.

8. In chuck apparatus having an actuator housing and a plurality of jaw elements spaced around the central axis thereof and supported thereby and defining a jaw cavity, jaw arms movably supporting each of said jaw elements for movement inwardly and outwardly relative to said jaw cavity, said jaw arms being supported by ball and socket joints, said jaw elements being rotatably mounted on one end of said jaw arms, the other end of said jaw arms extending within said actuator housing, actuator means movably mounted within said housing for reciprocable movement therein parallel to the central axis thereof, draw bar means to actuate said actuator means, linkage means connecting each of said spaced jaw elements to said actuator means within said actuator housing, and lost motion means provided between each of said jaw arms and said actuator means and being operable in response to pressure differentials on said jaw elements to control pressure application and equalize pressures exerted through said jaw elements.

9. In chucking apparatus having a plurality of jaw means adapted to grip and retain an annular workpiece, said jaw means defining a central jaw cavity and being equally circumferentially spaced therearound, said jaw cavity having a central axis about which said jaw means are equally radially outwardly spaced, a jaw actuator having a central axis aligned with said central axis of said jaw cavity and being movable axially therealong, a plurality of substantially cylindrical bores formed about the periphery of said actuator, each of said substantially cylindrical bores having a central axis extending at right angles to an imaginary line drawn perpendicularly through the central axis of said actuator and being perpendicular to the central axis, each of said cylindrical bores slidably and rotatably supporting a pair of substantially cylindrical slide members, said slide members being axially movable within said bore from a central position to opposite extreme positions, pin means rotatably connecting said slide members for relative rotational movement therebetween within said bore and for causing equal linear displacement thereof, said jaw means being operable in pairs, linkage means connecting one jaw means of a pair to the outer end of one of the pair of slide members and connecting the other jaw means of a pair to the outer end of the other of the pair of slide members, jaw arm means supporting each of said jaw means, and universal joint means incorporated in said linkage means and said jaw arm means to permit universal movement of said jaw means relative to said actuator whereby said pair of jaw means are movable in opposite directions by linear and rotative displacement of said slide members within said slide bore until the pressures exerted on each jaw element are equalized and fixedly locate said jaw element in a particular adjusted position.

10. In the chucking apparatus as defined in claim 9 and wherein said linkage means comprises a clevis member pivotally connected to said jaw arm means, a coupling rotatably connected to said clevis at one end, and pin means pivotally connecting the other end of said coupling to one of said pairs of slide members.

11. In the chucking apparatus as defined in claim 10 and wherein said one of said pair of slide members is provided with a longitudinally extending groove, said pin means and the end of said coupling being mounted within said groove.

12. In chucking apparatus as defined in claim 9 and wherein said linkage means comprises a slide block slidably mounted within said chuck housing for radial movement relative to the central axis of said housing, a connector extending between said slide block and said slide members, pin means pivotally connecting said connector to said slide members at one end, ball and socket means connecting said connector to said slide block at the other end, a port provided in said chuck housing and slidably receiving said slide block for movement therethrough, and a power actuator link connected to said slide block at one end and being pivotally connected to said jaw arm means at the other end.

13. In chucking apparatus as defined in claim 12 and wherein adjustment means are provided to vary the length of said power actuator and the location of said jaw arm means relative to the central axis of said housing.

References Cited in the file of this patent

UNITED STATES PATENTS

| | | |
|---|---|---|
| 2,443,895 | Day | June 22, 1948 |
| 2,455,663 | Eaton | Dec. 7, 1948 |
| 2,974,968 | Garrison | Mar. 14, 1961 |
| 3,044,791 | Nicosia | July 17, 1962 |